United States Patent
Hideaki et al.

(10) Patent No.: US 11,251,419 B2
(45) Date of Patent: Feb. 15, 2022

(54) LITHIUM ION BATTERY HAVING IMPROVED THERMAL STABILITY

(71) Applicant: Dow Global Technologies LLC, Midland, MI (US)

(72) Inventors: Maeda Hideaki, Midland, MI (US); Daojin Hang, Shanghai (CN); Xiangyang Tai, Shanghai (CN); Jing Jin, Shanghai (CN); Chunhua Huang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 193 days.

(21) Appl. No.: 15/535,252

(22) PCT Filed: Dec. 18, 2014

(86) PCT No.: PCT/CN2014/094280
§ 371 (c)(1),
(2) Date: Jun. 12, 2017

(87) PCT Pub. No.: WO2016/095177
PCT Pub. Date: Jun. 23, 2016

(65) Prior Publication Data
US 2017/0352876 A1 Dec. 7, 2017

(51) Int. Cl.
| | |
|---|---|
| *H01M 4/36* | (2006.01) |
| *H01M 10/0525* | (2010.01) |
| *H01M 4/58* | (2010.01) |
| *H01M 4/525* | (2010.01) |
| *H01M 4/1397* | (2010.01) |
| *H01M 4/1391* | (2010.01) |
| *H01M 4/136* | (2010.01) |
| *H01M 4/131* | (2010.01) |
| *H01M 4/505* | (2010.01) |
| *H01M 4/04* | (2006.01) |
| *H01M 4/02* | (2006.01) |

(52) U.S. Cl.
CPC ......... *H01M 4/364* (2013.01); *H01M 4/0404* (2013.01); *H01M 4/131* (2013.01); *H01M 4/136* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 5,858,324 A | 1/1999 | Dahn et al. |
| 5,871,866 A | 2/1999 | Barker et al. |
| 5,910,382 A | 6/1999 | Goodenough et al. |
| 6,368,749 B1 | 4/2002 | Yanai et al. |
| 6,514,640 B1 | 2/2003 | Armand et al. |
| 6,528,033 B1 | 3/2003 | Barker et al. |
| 6,632,566 B1 | 10/2003 | Yamada et al. |
| 6,716,372 B2 | 4/2004 | Barker et al. |
| 6,746,799 B2 | 6/2004 | Yamada et al. |
| 6,749,967 B2 | 6/2004 | Li et al. |
| 6,811,924 B2 | 11/2004 | Hosoya et al. |
| 6,814,764 B2 | 11/2004 | Hosoya et al. |
| 6,855,273 B2 | 2/2005 | Ravet et al. |
| 6,964,828 B2 | 11/2005 | Lu et al. |
| 7,029,795 B2 | 4/2006 | Li |
| 7,087,346 B2 | 8/2006 | Barker et al. |
| 7,169,511 B2 | 1/2007 | Noda et al. |
| 7,217,474 B2 | 5/2007 | Yamada et al. |
| 7,338,734 B2 | 3/2008 | Chiang et al. |
| 7,601,318 B2 | 10/2009 | Armand et al. |
| 2003/0064290 A1 | 4/2003 | Li |
| 2004/0005265 A1 | 1/2004 | Chiang et al. |
| 2004/0096743 A1 | 5/2004 | Okae et al. |
| 2006/0194112 A1 | 8/2006 | Barker et al. |

(Continued)

FOREIGN PATENT DOCUMENTS

| | | |
|---|---|---|
| CN | 101578724 A | 11/2009 |
| CN | 102074701 A | 5/2011 |

(Continued)

OTHER PUBLICATIONS

Extended European Search Report for European Application No. 14908212.5 dated Jun. 14, 2018.
International Search Report and Written Opinion for corresponding International Application No. PCT/CN2014/094280, dated Aug. 26, 2015, 8 pages.
Wu, H.-C. et al., *Effects of current collectors on power performance of $Li_4Ti_5O_{12}$ anode for Li-ion battery*, Journal of Power Sources 197, Elsevier (2012) 301-304.
Chong, J. et al, *A comparative study of polyacrylic acid and poly(vinylidene difluoride) binders for spherical natural graphite/ $LiFePO_4$ electrodes and cells*, Journal of Power Sources 196, Elsevier (2011) 7707-7714.

(Continued)

*Primary Examiner* — Christopher P Domone
(74) *Attorney, Agent, or Firm* — Alston & Bird LLP

(57) ABSTRACT

Aspects of the invention are based on the discovery that cathode materials and lithium ion batteries comprising the cathode material, having improved thermal stability may be produced from a cathode material that is comprised of a mixture of a lithium metal oxide and a lithium metal phosphate wherein the lithium metal phosphate comprises a volume fraction of secondary particles having a size of 0.1 to 3 μm that is from 5 to 100%, based on the total content of lithium metal phosphate. More specifically cathodes comprising lithium metal phosphates having the recited secondary particle ranges help provide cathode materials that are capable of passing the nail penetration test without generating smoke or flames. Methods of forming the cathode and lithium ion battery comprising the cathode are also provided.

13 Claims, No Drawings

(56) References Cited

U.S. PATENT DOCUMENTS

| | | | |
|---|---|---|---|
| 2009/0305132 A1 | 12/2009 | Gauthier et al. | |
| 2010/0112445 A1* | 5/2010 | Park | H01M 4/13 |
| | | | 429/221 |
| 2010/0327223 A1 | 12/2010 | Zaghib et al. | |
| 2011/0223482 A1* | 9/2011 | Fujii | H01M 4/364 |
| | | | 429/221 |
| 2012/0064408 A1 | 3/2012 | Song et al. | |
| 2012/0231341 A1* | 9/2012 | Kim | C01G 51/42 |
| | | | 429/223 |
| 2012/0315530 A1* | 12/2012 | Kageura | H01M 4/505 |
| | | | 429/144 |
| 2013/0149604 A1 | 6/2013 | Fujiki et al. | |
| 2013/0216911 A1 | 8/2013 | Hosoya et al. | |
| 2014/0106222 A1 | 4/2014 | Park et al. | |
| 2015/0118555 A1* | 4/2015 | Akikusa | H01M 4/525 |
| | | | 429/217 |
| 2016/0149205 A1* | 5/2016 | Theivanayagam | H01M 4/0404 |
| | | | 427/58 |
| 2017/0256789 A1* | 9/2017 | Kao | H01M 4/364 |

FOREIGN PATENT DOCUMENTS

| | | |
|---|---|---|
| CN | 102969500 | 3/2013 |
| CN | 103531765 A | 1/2014 |
| EP | 0782206 | 7/1997 |
| EP | 0813256 | 12/1997 |
| EP | 0849817 | 6/1998 |
| EP | 0872450 | 10/1998 |
| EP | 0918041 | 5/1999 |
| EP | 1295851 | 3/2003 |
| EP | 1296391 | 3/2003 |
| EP | 1 339 119 A1 | 8/2003 |
| EP | 2357693 | 8/2011 |
| EP | 2498323 | 9/2012 |
| EP | 2575201 | 4/2013 |
| JP | 9035715 | 2/1997 |
| JP | 11-307094 | 11/1999 |
| JP | 2002-151072 A | 5/2002 |
| JP | 2012-190786 A | 10/2012 |
| KR | 2002-0064371 | 8/2002 |
| KR | 2012-0104484 | 9/2012 |
| WO | WO 2008/088180 | 7/2008 |
| WO | WO 2008/091074 | 7/2008 |
| WO | WO 2009/057834 | 5/2009 |
| WO | WO 2009/117869 | 10/2009 |
| WO | WO 2013/016426 | 1/2013 |

OTHER PUBLICATIONS

Search Report of Chinese Application No. 214800839240 dated Feb. 28, 2020, 5 pages.
$2^{nd}$ Office Action issued for China Application No. 201480083924.0 dated Oct. 21, 2020 (10 pages).
Search Report for China Application No. 201480083924.0 dated Oct. 14, 2020 (4 pages).

* cited by examiner

LITHIUM ION BATTERY HAVING IMPROVED THERMAL STABILITY

FIELD OF THE INVENTION

The invention relates to a method making improved lithium ion batteries (LIBs) and cathodes to a make LIBs. In particular, the invention relates to lithium ion batteries comprised of lithium metal oxide cathode materials where improved battery characteristics may be achieved such as greater cycle life, safety and rate capability.

BACKGROUND OF THE INVENTION

Lithium ion batteries have over the past couple of decades been used in portable electronic equipment and more recently in hybrid or electric vehicles. Initially, lithium ion batteries first employed lithium cobalt oxide cathodes. Due to expense, toxicological issues and limited energy capacity other cathode materials have or are being developed.

One class of materials that has been developed and has been commercially employed is lithium metal oxides comprised of two or more of nickel, manganese and cobalt. These materials generally display a layered structure with a singular rhombohedral phase in which initial high specific charge capacities (~170 mAh/g) have been achieved when charged to voltages of about 4.2 volts vs Li/Li$^+$. Unfortunately, these materials have suffered from a short cycle life and safety issues related to oxygen evolution under certain conditions resulting in fires.

Li/Li+ represents the redox potential of the lithium reference electrode, which is defined as 0 volts by convention. Consequently, when using an anode other than Li metal, these voltages would be decreased to account for the difference in potential between this other anode and Li metal. Illustratively, a fully charged graphite anode has a potential of about 0.1 V vs Li/Li+. Therefore, when charging the cathode in a battery with a graphite anode to 4.25 V vs Li/Li+, the cell voltage will be approximately 4.15 V.

The cycle life is generally taken as the number of cycles (charge-discharge) before reaching a specific capacity that is 80% of the initial specific capacity. Each cycle for these materials is typically between the aforementioned 4.2 volts to 2 volts. These batteries have also suffered from inconsistencies in performance from one battery or cell to another, even though made from the same materials.

To solve some of the problems, the art has described numerous coatings, dopants as well as blending of other more stable cathode materials such as lithium iron phosphate. Examples include those described in U.S. Pat. Publ. Nos. 2004/0005265; 2004/0096743; 2006/0194112; and 2009/0305132; WO patent appl. Nos. 2008/088180; 2008/091074; 2009/057834; and 2013/016426 and Japanese Pat. No. 9035715A1. Unfortunately, even though these may have improved the safety of LIBs containing the cathode materials comprised of lithium metal oxides containing nickel, manganese, cobalt or combination thereof, the cycle life, battery capacity, or capacity at high rates of discharge were not improved.

Accordingly, it would be desirable to provide a method for forming LIBs having cathodes comprised of lithium metal oxides of nickel, manganese, cobalt or combinations thereof that results in more consistent performance, improved cycle life and greater energy capacity retention at faster charge/discharge rates while also improving the safety of such LIBs.

SUMMARY OF THE INVENTION

Aspects of the invention are based on the surprising discovery that cathode materials, and hence, LIBS, having improved thermal stability may be produced from a cathode material that is comprised of a mixture of a lithium metal oxide and a lithium metal phosphate wherein the lithium metal phosphate comprises a volume fraction of secondary particles having a size of 0.1 to 3 micrometers (μm) that is from 5 to 100%, based on the total content of lithium metal phosphate. More specifically, the inventors have discovered that cathodes comprising lithium metal phosphates having the recited secondary particle ranges help provide cathode materials that are capable of passing the nail penetration test without generating smoke or flames.

Lithium transitional metal oxides, such as lithium nickel manganese cobalt oxide (LNMCO) with a formula of $Li_xNi_yMn_zCo_{1-y-z}O_2$ wherein x=0.9-1.1, y=0.05<y<0.95, and z=0.05-0.95, are becoming increasingly attractive for use in energy storage applications, such as LIB applications for electric vehicles. LNMCO generally has higher capacity and higher press density than spinel type lithium manganese oxide ($LiMn_2O_4$) and olivine type lithium transitional metal phosphate ($LiMPO_4$). Accordingly, it is believed that LNMCO may provide comparable capacity to lithium cobalt oxide ($LiCoO_2$), while being more friendly to the environment and also providing better cost efficiency. However, the thermal stability of LNMCO and other lithium metal oxides present challenges to the use of these materials in LIBs.

In one aspect, embodiments of the present invention provide a method of forming a cathode comprising the steps of (a) mixing a lithium metal oxide and lithium metal phosphate in a solvent, wherein the lithium metal phosphate comprises a volume fraction of particles having a size of 0.1 to 3 μm that is from 5 to 100%, (b) coating the mixture of step (a) on to a metal foil; and (c) removing the solvent to form the cathode.

The method may also include one or more of the steps of depositing the cathode material on a conductive substrate, such as a metal foil; pressing the cathode material, and forming the cathode into an energy storage device, such as a lithium ion battery.

A further aspect of the invention is directed to cathode material comprising a lithium metal oxide and lithium metal phosphate in a solvent, wherein the lithium metal phosphate has a volume fraction of particles having a size of 0.1 to 3 μm that is from 5 to 100%.

As noted above, the inventors have discovered embodiments of the invention provide cathodes having improved thermal stability and safety. In particular, the inventors have also discovered that that thermal stability of cathodes comprising LNMCO can be improved by using a lithium metal phosphate comprising a volume fraction of particles having a size of 0.1 to 3 μm that is from 5 to 100%, based on the total content of the lithium metal phosphate.

In one embodiment, the lithium metal phosphate may comprise a volume fraction of particles having a size of 0.1 to 3 μm or less is at least 20%, and in particular, a lithium metal phosphate comprising a volume fraction of particles having a size of 0.1 to 3 μm is at least 50%. In some embodiments, the lithium metal phosphate may comprise a D50 particle distribution that is greater than 0.1 μm, and equal to or less than 2.5, 2.6, 2.7, 2.8, 2.9, 3.0, 3.1, 3.2, 3.3, 3.4, or 0.1 to 3 μm. Preferably, the lithium metal phosphate has a D50 that is between 0.1 and 3.1 μm.

In a preferred embodiment, the lithium metal phosphate has the formula $Li_{1+a}Mn_bFe_cM_{1-b-c}PO_4$, wherein a is a number from 0.0 to 0.2, and preferably from 0.0 to 0.15, and more preferably from 0 to 0.12;

b is a number from 0.05 to 0.95, and preferably from 0.1 to 0.9, and more preferably from 0.2 to 0.8;

c is a number from 0.05 to 0.95, and preferably from 0.1 to 0.9, and more preferably from 0.2 to 0.8; and (1−b−c) is from 0.0 to 0.2, and preferably from 0.0 to 0.15, and more preferably from 0.0 to 0.12, a and wherein M is a metal ion selected from one or more of magnesium, calcium, strontium, cobalt, titanium, zirconium, molybdenum, vanadium, niobium, nickel, scandium, chromium, copper, zinc, beryllium, lanthanum and aluminum.

In a further embodiment, the lithium metal oxide has the formula $Li_xNi_yMn_zCo_{(2-x-y-z)}D_wO_2$, wherein x is a number from 0.9 to 1.15, and preferably from 0.95 to 0.110, and more preferably from 0.98 to 1.08;

y is a number from 0.05 to 0.95, and preferably from 0.2 to 0.95, and more preferably from 0.3 to 0.95;

z is a number from 0.05 to 0.95, and preferably from 0.05 to 0.8, and more preferably from 0.05 to 0.7;

(2−x−y−z) is from 0.05 to 0.95, and preferably from 0.05 to 0.8, and more preferably from 0.5 to 0.7; and w is 0 to 0.4, and preferably 0 to 0.3, and wherein D is selected from the group consisting of B, Al, Ti, Mg, Nb, Si, Fe, V, Cr Cu, Zn, Ga and W, and is preferably selected from the group consisting of Al, Ti, Mg, and Nb.

In one embodiment, the lithium metal oxide has the formula $Li_xNi_yMn_zCo_{(2-x-y-z)}O_2$ wherein x is a number from 0.9 to 1.15, and preferably from 0.95 to 0.110, and more preferably from 0.98 to 1.08;

y is a number from 0.05 to 0.95, and preferably from 0.2 to 0.95, and more preferably from 0.3 to 0.95;

z is a number from 0.05 to 0.95, and preferably from 0.05 to 0.8, and more preferably from 0.05 to 0.7; and (2−x−y−z) is from 0.05 to 0.95, and preferably from 0.05 to 0.8, and more preferably from 0.5 to 0.7.

A another aspect is directed to a cathode comprising a metal foil having a first and second face and a cathode material coated on at least one face of the foil, and wherein the cathode material comprises a mixture of lithium metal oxide and a lithium metal phosphate wherein the amount of lithium metal phosphate is 5% to 90% by weight of the mixture, and wherein the lithium metal phosphate comprises a volume fraction of secondary particles having a size of 0.1 to 3 μm is from 5 to 100, and preferably at least 20%, at least 25%, and least 30% or more.

Aspects of the invention are also directed to a lithium ion battery comprising a cathode in accordance with embodiments of the invention.

DETAILED DESCRIPTION OF THE INVENTION

The inventors have now surprisingly discovered that the thermal stability and safety of cathode materials comprising a lithium metal oxide, such as LNMCO, and a lithium metal phosphate in which the lithium metal phosphate comprises a volume fraction of particles having a size of 0.1 to 3 μm that is from 5 to 100%, based on the total content of lithium metal phosphate.

Lithium metal phosphates that may be used in aspects of the invention generally include any that is capable of insertion and extraction of lithium. Suitable lithium metal phosphates include, for example, those described in U.S. Pat. Nos. 5,910,382; 6,514,640; 5,871,866; 6,632,566; 7,217,474; 6,528,033; 6,716,372; 6,749,967; 6,746,799; 6,811,924; 6,814,764; 7,029,795; 7,087,346; 6,855,273; 7,601,318; 7,338,734; and 2010/0327223.

A preferred lithium metal phosphate is one in which a majority of the metal is Mn, which has a higher redox potential, for example, than iron in lithium iron phosphate. The higher redox potential of the Mn has been found to be useful in realizing a LIB with smooth or uniform discharge curves when mixed with the lithium metal oxides.

A desirable lithium metal phosphate is one that has an empirical formula:

$$Li_{1+a}Mn_bFe_cM_{1-b-c}PO_4, \quad \text{Formula (I)}$$

wherein a is a number from 0.0 to 0.2, and preferably from 0.0 to 0.15, and more preferably from 0 to 0.12;

b is a number from 0.05 to 0.95, and preferably from 0.1 to 0.9, and more preferably from 0.2 to 0.8;

c is a number from 0.05 to 0.95, and preferably from 0.1 to 0.9, and more preferably from 0.2 to 0.8; and (1−b−c) is from 0.0 to 0.2, and preferably from 0.0 to 0.15, and more preferably from 0.0 to 0.12.

M is a metal ion selected from one or more of magnesium, calcium, strontium, cobalt, titanium, zirconium, molybdenum, vanadium, niobium, nickel, scandium, chromium, copper, zinc, beryllium, lanthanum and aluminum. In some embodiments, at least a portion of the lithium metal phosphate has an olivine structure. It is further preferred that M is magnesium, cobalt or combination thereof. This particular phosphate material has been found to not only improve cycle life even though it has high Mn concentration, but also not deleteriously affect the voltage discharge profiles of the battery as do high iron containing lithium metal phosphates.

Additional lithium metal phosphates may include those having an empirical formula:

$$Li_aMn_bFe_cM_dPO_4: \quad \text{Formula (II)},$$

wherein a is a number from 0.85 to 1.15;

b is from 0.51 to 0.95;

c is from 0.05 to 0.49;

d is from 0.000 to 0.1;

M being a metal ion selected from one or more of magnesium, calcium, strontium, cobalt, titanium, zirconium, molybdenum, vanadium, niobium, nickel, scandium, chromium, copper, zinc, beryllium, lanthanum and aluminum. In one embodiment, the lithium metal phosphate may be one having an empirical formula $Li_aMn_bFe_cM_dPO_4$, wherein a is a number from 0.85 to 1.15;

b is from 0.65 to 0.95;

c is from 0.049 to 0349;

d is from 0.001 to 0.1;

2.75≤(a+2b+2c+dV)≤3.10, wherein V is the valence of M, and M is a metal ion selected from one or more of magnesium, calcium, strontium, cobalt, titanium, zirconium, molybdenum, vanadium, niobium, nickel, scandium, chromium, copper, zinc, beryllium, lanthanum and aluminum, and further wherein at least a portion of the lithium metal phosphate has an olivine structure.

As noted above, it is desirable that the lithium metal phosphate has a volume fraction of secondary particles having a size of 0.1 μm to 3 micrometers (μm) that is from 5 to 100% based on the total content of the lithium metal phosphate. Preferably, the volume fraction of secondary particles having a size of 0.1 μm to 3 μm is from 10 to 90%, and more preferably, from 15 to 80%, based on the total content of the lithium metal phosphate.

In one embodiment, the lithium metal phosphate has a volume fraction of secondary particles having a size of 0.1 to 3 μm that is at least 5%, based on the total content of the lithium metal phosphate. For example, the lithium metal phosphate preferably includes a volume fraction of secondary particles having a size of 0.1 to 3 μm that is at least 10%, at least 15%, at least 20%, at least 22%, at least 24%, at least 26%, at least 28%, at least 30%, at least 32%, at least 34%, at least 36%, at least 38%, at least 40%, at least 42%, at least 44%, at least 46%, at least 48%, and at least 50%, %, based on the total content of the lithium metal phosphate.

The volume fraction of secondary particles may also be characterized in terms of the particle distribution of the secondary particles. For example, in embodiments of the present invention, the lithium metal phosphate generally has a median (D50) secondary particle size of 0.1 micrometer to 3.5 micrometers. The particle size distribution is given by D10, D50, and D90 particles sizes. D10 is the size where 10% of the particles are smaller, D50 is the size where 50% of the particles are smaller, and D90 is the particle size where 90% of the particles are smaller in a given distribution by number. The D10 typically is equal or less than 0.1, 0.2, 0.3, 0.4, 0.5, 0.6, 0.7, 0.8, 0.9, or 1.0 micrometer. The D50 is at least 0.1 μm, and is typically at least equal to or less than 2.5, 2.6, 2.7, 2.8, 2.9, 3.0, 3.1, 3.2, 3.3, 3.4, or 3.5 micrometers. The D90 is typically equal to or less than 7, 8, 9, 10, 11, 12, 13, 14, or 15 micrometers.

The term "secondary particles" as used herein refers to nanoscale primary particles that have agglomerated to form larger particles having a size of about 0.1 micrometers or larger. Thus, secondary particles refers to agglomerations of nanoscale particles, and thus excludes primary particles having a size of less than 0.1 μm.

Particle size can be measured with any appropriate method known in the art. For example, particle size may be measured using laser diffraction.

In one embodiment, the lithium metal phosphate may comprise a mixture of two different lithium metal phosphates in which one of the lithium metal phosphates may not meet the required particle sizes as discussed For example, in one embodiment, the lithium metal phosphate may comprise a mixture of two or more lithium metal phosphates with at least a first lithium metal phosphates having a volume fraction of particles having a size of 0.1 to 3 μm that is from 5 to 100%, and at least a second lithium metal phosphate having a volume fraction of particles having a size of 0.1 to 3 μm that is 0% or substantially near to 0% provided the mixture of lithium metal phosphates has a volume fraction of secondary particles having a size of 0.1 to 3 μm or less that is between 5 and 100%. Preferably, such a mixture of lithium metal phosphates has a volume fraction of particles having a size of 0.1 to 3 μm that is at least 10%, at least 15%, at least 20%, at least 22%, at least 24%, at least 26%, at least 28%, or at least 30%, or more.

The lithium metal oxide may be any that is capable of insertion and extraction of lithium in a LIB such as those known in the art. Examples of such lithium metal oxides include those described U.S. Pat. Nos. 5,858,324; 6,368,749; 6,964,828; and EP Pat. Nos. 0782206; 1296391; 0813256; 1295851; 0849817; 0872450; and 0918041 and JP Pat. No. 11-307094. Preferred metal oxides include those that have a layered structure of the Rm3 type also referred to as O3 structures that display a singular phase.

Additional lithium metal oxides that may be used in embodiments of the include those that are described by U.S. Pat. No. 6,964,828. A preferred lithium metal oxide may have the following empirical formula.

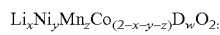 Formula (III), wherein
x is a number from 0.9 to 1.15, and preferably from 0.95 to 0.110, and more preferably from 0.98 to 1.08;
y is a number from 0.05 to 0.95, and preferably from 0.2 to 0.95, and more preferably from 0.3 to 0.95;
z is a number from 0.05 to 0.95, and preferably from 0.05 to 0.8, and more preferably from 0.05 to 0.7;
(2−x−y−z) is from 0.05 to 0.95, and preferably from 0.05 to 0.8, and more preferably from 0.5 to 0.7; and
w is 0 to 0.4, and preferably 0 to 0.3. D may be any one or more of Al, Ti, Mg, Nb, or any other metal suitable for use as a doping element. In one embodiment, D is selected from the group consisting of B, Al, Ti, Mg, Nb, Si, Fe, V, Cr Cu, Zn, Ga and W.

A preferred lithium metal oxide has the empirical formulas 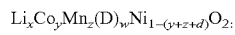, wherein x, y, and z are the same as described above.

Desirable lithium metal oxides may also include those having the following formula.

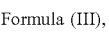 Formula (IV)

where (D) denotes a metal other than Co, Mn or Ni and x is greater than 0 to 1.2; y is 0.1 to 0.5, z is 0.05 to 0.4 and w is 0 to 0.4 and b+c+d is 0.15 to 0.5. D is preferably B, Al, Si, Fe, V, Cr Cu, Zn, Ga and W. Preferably "x" is less than 1.1 and more preferably less than 1.05. It is understood that LIBs made from such cathode materials are assembled in the discharged state (i.e., lithium is present in the lithium metal oxide "x~1" and then is extracted and inserted into the anode upon charging the LIB for the first time). It is also understood that more than one lithium metal oxide may be used wherein the lithium metal oxide may differ in chemistry, primary particle size or the like.

An additional example of a lithium metal oxide that may be used in embodiments of the present invention is LiCoO$_2$.

The weight percentage amount of the lithium metal phosphate in the active cathode material generally ranges from 5 to 90 weight percent, based on the total weight percent of the cathode material. Preferably, the amount of the lithium metal phosphate in the active cathode material is from 5 to 60 weight percent, and more preferably, from 10 to 50 weight percent, based on the total weight percent of the cathode material.

The weight percentage amount of the lithium metal oxide in the active cathode material generally ranges from 10 to 95 weight percent, based on the total weight percent of the cathode material. Preferably, the amount of the lithium metal oxide in the active cathode material is from 30 to 90 weight percent, and more preferably, from 50 to 85 weight percent, based on the total weight percent of the cathode material.

The lithium metal phosphate depending on the particular metals may advantageously have an electronic coating thereon. The coating generally is present in an amount of 0.5% by weight to 20% by weight of the lithium metal phosphate and said coating. It is desirable to have as little coating as possible and as such the amount is desirably at most 10%, 8%, 5% or even 3%. Typically, the coating is carbonaceous and may include graphitic carbon, amorphous carbon or combinations thereof. A desirable carbon coating may be one resulting from the carburization of an organic compound such as those known in the art, with examples being phenol, formaldehydes, sugars (e.g., lactose, glucose and fructose), starches, and celluloses.

In one embodiment, it may be desirable to mix the lithium metal oxide and lithium metal phosphate in a solvent so as to allow for a uniform mixture to be formed. The solvent may be any suitable solvent such as those known in the art and typically are polar and apolar organic solvents with low water contents (e.g., 500 ppm or less and preferably less than 100, 50, 10 or even 1 ppm). Examples of useful solvents include organic solvents such as n-methyl pyrrolidone (NMP) and acetone and polar solvents such as water and those described by Jin Chong, et al., *Journal of Power Sources* 196 (2011) pp. 7707-7714.

The amount of solids (lithium metal oxide and phosphate) may be any useful amount. Typically the amount is from 10% to 90% by volume of the solvent and may be at least 20% or 30% to at most 80% or 70%.

In some embodiments, it may be desirable that the mixing be under conditions of low shear mixing techniques such as simple paddle mixers with or without baffles. Generally, the shear rate is at most about 5000 sec$^{-1}$ and generally is about 1 sec$^{-1}$ to about 1000 sec$^{-1}$. Other known additives useful for casting slurries on to foils may be utilized, such as suitable dispersants, lubricants, binders and water scavengers.

The mixing is performed for a time to disperse the lithium metal oxide and lithium metal phosphate sufficiently so that the desired results are achieved. Typically the time may be from several minutes to any time that is practicable such as days or hours.

The mixture may then be coated on to a metal foil that is useful for making electrodes in is batteries such as aluminum, carbon coated aluminum, etched aluminum, nickel, copper, gold, silver, platinum, and alloys of the aforementioned or combinations thereof and include those described in Hsien-Chang Wu et. al., *Journal of Power Sources* 197 (2012) pp. 301-304.

The coating of the slurry may be done by any useful technique such as those known in the art. Typically, the method employed is a doctor blade casting at a desired gap.

The solvent is then removed to form the cathode. The removing may be any suitable method such as evaporating with or without heating under as static or flowing air or other suitable atmosphere such as dry air, inert atmosphere (nitrogen or inert gas such as a noble gas) or vacuum. If heating is employed, the temperature is any useful for the particular solvent employed and may be 30° C. to 500° C., but is preferably 50 to 150° C. The time may be any suitable time such as several minutes to days or hours. The heating may be any useful heating such as resistance, convection, microwave, induction or any known heating method.

In one embodiment, after the solvent has been removed, the cathode is further subjected to pressing. This pressing in many instances is referred to calendering in the art to further increase the density of the lithium metal oxide/lithium metal phosphate coating on the metal foil. Typically, calendering is performed by passing the cathode through a roll press with a set gap to realize a cathode with uniform thickness. The cathode may be passed through the roll press multiple times with changing gaps or the same gap depending on the behavior of the coating. When doing the pressing, it is desirable to only distort the secondary particles of the lithium metal phosphate and not have any appreciable change such as fracturing of the lithium metal phosphate secondary particles. Generally, this corresponds to a pressure that is at most about 500 MPa and is desirably at most about 250, 180, 170 or 160 MPa to some low pressure which may be at least about 10 MPa. Likewise, the pressure should not be so great to cause any electronic conducting coating to be fractured off the lithium metal phosphate and also not so high that the density of the coating is too high, for example, the electrolyte employed in the battery has difficulty wetting the cathode sufficiently to achieve the desired results.

Typically, the coating has a % theoretical density that is 40% to 85% of theoretical density (60% to 15% porous). It is desirable for the theoretical density to be at least 45%, 50% or even 55% to 80%, 75% or even 70%.

The cathode is useful in making improved LIBs and when making such LIBs, suitable anode materials include, for example, carbonaceous materials such as natural or artificial graphite, carbonized pitch, carbon fibers, graphitized mesophase microspheres, furnace black, acetylene black, and various other graphitized materials. Suitable carbonaceous anodes and methods for making them are described, for example, in U.S. Pat. No. 7,169,511. Other suitable anode materials include lithium metal, lithium alloys, other lithium compounds such as lithium titanate and metal oxides such as $TiO_2$, $SnO_2$ and $SiO_2$, as well as materials such as Si, Sn, or Sb. The anode may be made using one or more suitable anode materials.

The separator of the LIB is generally a non-conductive material. It should not be reactive with or soluble in the electrolyte solution or any of the components of the electrolyte solution under operating conditions but must allow lithium ionic transport between the anode and cathode. Polymeric separators are generally suitable. Examples of suitable polymers for forming the separator include polyethylene, polypropylene, polybutene-1, poly-3-methylpentene, ethylene-propylene copolymers, polytetra-fluoroethylene, polystyrene, polymethylmethacrylate, polydimethylsiloxane, polyethersulfones and the like.

Generally, the battery electrolyte solution has a lithium salt concentration of at least 0.1 moles/liter (0.1 M), preferably at least 0.5 moles/liter (0.5 M), more preferably at least 0.75 moles/liter (0.75 M), preferably up to 3 moles/liter (3.0 M), and more preferably up to 1.5 moles/liter (1.5 M). The lithium salt may be any that is suitable for battery use, including lithium salts such as $LiAsF_6$, $LiPF_6$, $LiPF_4(C_2O_4)$, $LiPF_2(C_2O_4)_2$, $LiBF_4$, $LiB(C_2O_4)_2$, $LiBF_2(C_2O_4)$, $LiClO_4$, $LiBrO_4$, $LiIO_4$, $LiB(C_6H_5)_4$, $LiCH_3SO_3$, $LiN(SO_2C_2F_5)_2$, and $LiCF_3SO_3$. The solvent in the battery electrolyte solution may be or include, for example, a cyclic alkylene carbonate like ethylene carbonate; a dialkyl carbonate such as diethyl carbonate, dimethyl carbonate or methylethyl carbonate, various alkyl ethers; various cyclic esters; various mononitriles; dinitriles such as glutaronitrile; symmetric or asymmetric sulfones, as well as derivatives thereof; various sulfolanes, various organic esters and ether esters having up to 12 carbon atoms, and the like.

EXAMPLES

In the following Examples, cathodes and cells were made and subjected to thermal testing to evaluate the thermal stability of the inventive cathode composition and cells made therefrom.

The materials used in the cells are identified below. All percentages are weight percents unless indicated otherwise. All physical property and compositional values are approximate unless indicated otherwise.

"LMO-1": lithium metal oxide available from Daejeon Energy Materials Co., and having the chemical formula $LiNi_{0.5}Mn_{0.3}Co_{0.2}O_2$, and having a D50 particle distribution of 10.41 μm.

"LMO-2": lithium metal oxide available from Xiamen Wuye Co., and having the chemical formula $LiNi_{1/3}Mn_{1/3}Co_{1/3}O_2$.

"LMFP-1": lithium metal phosphate available from Dow Chemical and having the formula $LiMnFePO_4$, and having a D10, D50, and D90 of 0.984 μm, 3.056 μm, and 7.074 μm, respectively. The volume fraction of secondary particles having a size from 0.1 to 3 micrometers is 49.8%.

"LMFP-2": lithium metal phosphate available from Dow Chemical and having the formula LiMnFePO$_4$, and having a D10, D50, and D90 of 5.536 μm, 9.9947 μm, and 17.28 μm, respectively. The volume fraction of secondary particles having a size below 3 micrometers is 0%.

"CA": conductive carbon additive commercially available under the tradename SUPER P™ Li from TIMCAL.

"PVDF": polyvinylidene fluoride as a binder and available from Solvay Specialty Polymers under the tradename SOLEF® 5130 PVDF.

"NMP": N-Methylpyrrolidone (98.5% anhydrous) available from J&K Chemical.

"Electrolyte-1": electrolyte solution of a 1 molar LiPF$_6$ solution in a 1:3 by weight mixture of ethylene carbonate and dimethylcarbonate, available from China Energy Lithium Co., Ltd.

"Electrolyte-2": commercially available electrolyte solution under the product name TK032, and available from BASF.

In all the examples below, particle sizes were measured using a Beckman Coulter LS 13 Laser Diffraction Particle size analyzer.

Inventive Example 1

LMO-1 was blended with LMFP-1 as follows to prepare the active cathode material. LMO-1 and LMFP-1 were manually blended in a cup at a ratio of 80:20 to make the active cathode material. The resulting active cathode material was mixed with binder (PVDF), conductive carbon (CA) and solvent (NMP) to prepare a slurry of the active cathode material.

The slurry was coated using a doctor blade onto an aluminum foil (20 μm thick) available from Shezhen Fulaishun Electronic Material Co. After coating, the NMP was removed by drying at 80° C. for 30 minutes, and then further vacuum dried at 130° C. for 10 hours. Cathode wafers were prepared by cutting a 12 mm diameter samples from the dried cathode. The cathode wafers were incorporated into CR2016 coin cells. The anode in each case is lithium (in the case of a half cell) and a commercially available graphite, (FT-1 powder obtained from Jiangi Zicheng, Co.), (in the case of a full cell). A commercially available separator is used with an electrolyte (Electrolyte-1) of a 1 molar LiPF$_6$ solution in a 1:3 by weight mixture of ethylene carbonate and dimethylcarbonate.

The coin half cell was charged using a constant current (1/10 C-rate) to 4.3 V, and then held at a constant voltage of 4.3V to a current of C/100. The cell was then discharged at 0.1 C to 2.8V. The charge/discharge cycle was repeated twice, and finally the cell was charged at 0.1 C consistent current to 4.3V, and held at a constant voltage of 4.3V to a current of C/100.

The thermal behavior (DSC) of the charged cathodes (4.3 V) was evaluated. The fully charged cell was disassembled in glove box. The cathode wafer was taken out and washed three times with di-methyl carbonate (DMC), and dried in the glove box for 24 hours. 1.5 mg of cathode powder was removed from the dried wafer and placed into a stainless-steel high-pressure DSC cell and filled charged with 1.5 mg of Electrolyte-1. The cell was then hermetically sealed for DSC testing.

DSC was conducted from room temperature up to 350° C. at ramp speed of 5° C./min. The peak heat release temperature and total heat release is summarized in Table 1 below.

Pouch cells were prepared comprising the active cathode material of Inventive Example 1.

Cathode material comprising 93 weight % of active materials, 4 weight % of (PVDF) binder, and 3 weight % of CA as conductive additives were made by coating a slurry of the cathode material in NMP onto Al foil (20 μm thick). The solvent was removed by drying successively at 80° C. for 2.5 minutes, 95° C. for 2.5 minutes, and 90° C. for 2.5 minutes. The dried cathode was then further vacuum dried at 120° C. for 12 hours. The cathode was then pressed with a roll press at an applied pressure between 125 and 130 tons to a density of about 3 g/cm$^3$. The pressed cathode was vacuum dried again at 120° C. for 12 hours. The cathode was then cut and assembled into 10 Ahr, 20 Ahr, 30 Ahr and 40 Ahr pouch cells. The anode was a commercially available graphite, (FT-1 powder obtained from Jiangi Zicheng, Co.). A commercially available separator is used with an electrolyte (Electrolyte-2), TK032 available from BASF.

Electrochemical properties of the fabricated pouch cell was conducted on Arbin testing station, with the procedure set forth below. Specific discharge capacity at 0.3 C is summarized in Table 2 below.

1) Rest 24 hours at 38° C.
2) $1^{st}$ charge: 0.02 C 8 hr, 0.1 C 1 hr, 0.5C to 4.2V, C/20 cut.
3) $1^{st}$ discharge: 0.5 C to 3.0 V
4) $2^{nd}$ charge: 0.5 C to 4.2 V, C/20 cut, aging at 80° C. for 6 hr.
5) $2^{nd}$ discharge: 0.5 C to 3.0V
6) $3^{rd}$ charge: 0.3 C to 4.2V, C/20 cut
7) $3^{rd}$ discharge: 0.3 C to 3.0V
8) $4^{th}$ charge: 0.3 C to 4.2V, C/20 cut
9) $4^{th}$ discharge: 0.3 C to 3.0V
10) $5^{th}$ charge: 0.5 C 1 hr, end.

The pouch cell after EC testing was discharged at 1 C to 3.0 V, followed with charging at constant 1 C current to a voltage 4.2 V, and a constant voltage a current of C/20. The charged pouches were then subjected to Nail testing to evaluate the thermal stability of the inventive cathode material.

Nail penetration was done at room temperature, with a nail having a 3 mm diameter, and at a penetration speed of 80 mm/sec. The results are summarized in Table 3 below.

All tested pouch cells of 20 Ahr and 30 Ahr passed without smoke or fire. Existence of small particle size LMFP surprisingly boosted thermal stability and safety of a lithium ion battery.

Inventive Example 2

In this Example, half cells were prepared as in Example 1, with the exception that the lithium metal phosphate comprised a blend of LMFP-1 and LMFP-2 at a 1:1 ratio. The resulting cathode material had total weight ratio for LMO:LMFP-1:LMFP-2 of 80:10:10. The mixture of LMFP-1 and LMFP-2 had a particle distribution of D10, D50, and D90 of 1.658 μm, 5.882 μm, and 14.13 μm, respectively. Volume fraction of secondary particles having a particle size of less than 3 μm was 24.9%.

Thermal properties of the cathode were evaluated using the same procedures as set forth in Example 1.

Inventive Example 3

In this Example, a cathode was prepared as in Example 1 with the exception that LMO-2 was used in place of LMO-1. Particle size distribution of LMO-2 was measured as described above. LMO-2 had a D50 of 10.14 um. Active material was made by mixing LMO-2 with LMFP-1 manually in a cup with weight ratio 80:20.

Pouch cells comprising the cathode of Example 3 were prepared with the same experimental procedures described above for Inventive Example 1. 10 Ahr, 20 Ahr, 30 Ahr and 40 Ahr pouch cells were fabricated. Electrochemical properties evaluation and nail penetration testing were conducted accordingly following the same procedure and condition as in Inventive example 1. The results are summarized in Table 3 below.

All tested pouch cells of 20 Ahr and 30 Ahr passed without smoke or fire. Two 40 Ahr cells were prepared wherein one passed the test and other generated smoke. Although, one of the 40 Ahr cells generated smoke, overall the tests shows that lithium metal phosphate having particles sizes of less than 3 μm can surprisingly boosted thermal stability and safety of the lithium ion battery. Testing results are summarized in Table 4.

Comparative Example 1

In this example, a cathode was prepared using LMO-2 and LMFP-2. As in Inventive Example 1, the materials were blended in a 80:20 ratio. Blending was done manually in a cup.

Particle size distribution of LMFP-2 was measure as in Inventive Example 1. LMFP-2 had a particle size distribution D10, D50 and D90 of 5.536 μm, 9.947 μm and 17.28 μm, respectively. The volume fraction of particles below 3 μm in LMFP-2 is 0%.

Thermal properties were evaluated with the same experimental procedure described in Inventive example 1, and are summarized in Table 1 below.

Pouch cells comprising the cathode of Comparative Example 1 were prepared with the same experimental procedures described above for Inventive Example 1. 10 Ahr, 20 Ahr and 30 Ahr pouch cells were fabricated. Electrochemical properties evaluation and nail penetration testing were conducted accordingly following the same procedure and condition as in Inventive example 1. The results are summarized in Tables 2 and 3 below.

As can be seen in Table 3, for the two 20 Ahr pouch cells prepared, one generated smoke and the other generated fire. One 30 Ahr pouch cell was tested, which generated fire. From these results in comparison to the results for Inventive Example 1, it can be seen that cathode materials having a smaller particle distribution for the lithium metal phosphate component (e.g., 5-100% volume fraction having a particle size of less than 3 μm) may provide improvements in thermal stability and safety in a LIB.

Comparative Example 2

In this example, an active electrode material was made by mixing LMO-2 and LMFP-2 manually in a cup at a weight ratio 80:20. All other components, percentages, and procedures remain the same as in Inventive Example 1.

Pouch cells comprising the cathode of Comparative Example 2 were prepared with the same experimental procedures described above for Inventive Example 1. 10 Ahr, 20 Ahr and 30 Ahr pouch cells were fabricated. Electrochemical properties evaluation and nail penetration testing were conducted accordingly following the same procedure and condition as in Inventive example 1. The results are summarized in Tables 2 and 3 below.

For two 20 Ahr pouch cells prepared, one generated smoke and the other generated fire. One 30 Ahr pouch cell was tested, which generated fire. As discussed above, the lack of particles having a size below 3 μm resulted in a LIB having poor thermal stability and safety.

TABLE 1

Particle size Distribution and Thermal (DSC) Data

| Sample No. | Cathode Composition | LMFP D10 (μm) | LMFP D50 (μm) | LMFP D90 (μm) | Vol. % of LMFP below 3 μm | $T_{Peak}$ (° C.) | Heat (J/g) |
|---|---|---|---|---|---|---|---|
| Inventive Example 1 | LMO-1:LMFP-1 80:20 | 0.984 | 3.056 | 7.074 | 49.8 | 325.3 | 461 |
| Inventive Example 2 | LMO-1:LMFP-1:LMFP-2 80:10:10 | 1.658 | 5.882 | 14.13 | 24.9 | 318.1 | 501.7 |
| Comparative Example 1 | LMO-1:LMFP-2 80:20 | 5.536 | 7.259 | 17.28 | 0 | 312.2 | 585.39 |

TABLE 2

Discharge capacity and Press Density of Cathode Material

| Sample No. | Cathode Composition | Discharge Capacity (full cell, 3.0 V to 4.2 V, 0.3 C.) (mAhr/g) | | | | Press Density (g/cm³) |
|---|---|---|---|---|---|---|
| | | 10 Ahr pouch | 20 Ahr pouch | 30 Ahr pouch | 40 Ahr pouch | |
| Inventive Example 1 | LMO-1:LMFP-1 80:20 | 146.84 | 147.38 | 147.96 | 148.03 | 3.023 |
| Inventive Example 3 | LMO-2:LMFP-1 80:20 | 138.68 | 139.78 | 140.50 | 140.88 | 2.973 |
| Comparative Example 1 | LMO-1:LMFP-2 80:20 | 146.02 | 146.70 | 145.90 | — | 3.000 |
| Comparative Example 2 | LMO-2:LMFP-2 80:20 | 139.54 | 139.74 | — | — | 2.982 |

TABLE 3

Nail Penetration Performance

| Sample No. | Cathode Composition | Nail Penetration Results | | | | | |
|---|---|---|---|---|---|---|---|
| | | 20 Ahr pouch (1) | 20 Ahr pouch (2) | 30 Ahr pouch (1) | 30 Ahr pouch (2) | 40 Ahr pouch (1) | 40 Ahr pouch (2) |
| Inventive Example 1 | LMO-1:LMFP-1 80:20 | Pass | N/A | Pass | Pass | — | — |
| Inventive Example 3 | LMO-2:LMFP-1 80:20 | — | — | Pass | Pass | Pass | Smoke |
| Comparative Example 1 | LMO-1:LMFP-2 80:20 | Smoke | Fire | Fire | — | — | — |
| Comparative Example 2 | LM0-2:LMFP-2 80:20 | Smoke | Fire | Fire | — | — | — |

What is claimed is:

1. A method of forming a cathode comprising:
(a) mixing a lithium metal oxide and a lithium metal phosphate in a solvent, wherein the lithium metal phosphate has a D50 equal to or less than 3.5 micrometers, has a volume fraction of secondary particles having a size of 0.1 to 3 micrometers that is from 5 to 100%, based on the total content of the lithium metal phosphate, wherein the mixture comprises 10% to 50% by weight of lithium metal phosphate, and wherein the lithium metal oxide is represented by the following formula:

$Li_xNi_y Mn_zCo_{(2-x-y-z)}D_wO_2$ or $Li_xNi_y Mn_zCo_{(2-x-y-z)}O_2$ wherein
x is a number from 0.9 to 1.15;
y is a number from 0.05 to 0.95;
z is a number from 0.05 to 0.95;
(2-x-y-z) is from 0.5 to 0.7; and
w is 0 to 0.4, and wherein D, when present, is selected from the group consisting of B, Al, Ti, Mg, Nb, Si, Fe, V, Cr Cu, Zn, Ga and W;
(b) coating the mixture of step (a) on to a metal foil; and
(c) removing the solvent to form the cathode having a lithium metal oxide/lithium metal phosphate coating on the metal foil, wherein the lithium metal oxide/lithium metal phosphate coating has a % theoretical density that is 40-55% of theoretical density.

2. The method of claim 1, wherein the volume fraction of secondary particles having a size of 0.1 to 3 micrometers that is at least 20%, based on the total content of the lithium metal phosphate.

3. The method of claim 1, wherein the volume fraction of secondary particles having a size of 0.1 to 3 micrometers that is at least 50%, based on the total content of the lithium metal phosphate.

4. The method of claim 1, wherein the lithium metal phosphate has the formula:

$Li_{1+a}Mn_bFe_cM_{1-b-c}PO_4$,   Formula (I)

wherein
a is a number from 0.0 to 0.2;
b is a number from 0.05 to 0.95;
c is a number from 0.05 to 0.95; and
(1-b-c) is from 0.0 to 0.2,
wherein M is a metal ion selected from one or more of magnesium, calcium, strontium, cobalt, titanium, zirconium, molybdenum, vanadium, niobium, nickel, scandium, chromium, copper, zinc, beryllium, lanthanum and aluminum.

5. The method of claim 1, wherein the lithium metal phosphate comprises a mixture of two different lithium metal phosphates with a first of said lithium metal phosphates having a volume fraction of secondary particles having a size of 0.1 to 3 micrometers that is at least 20%, and the second of said lithium metal phosphates having a volume fraction of particles having a size of 0.1 to 3 micrometers that is 0%, and wherein the mixture of lithium metal phosphates has a collective volume fraction of secondary particles having a size of 0.1 to 3 micrometers that is at least 20%, based on the total content of the lithium metal phosphate.

6. The method according to claim 1, wherein a pouch cell comprising the cathode of claim 1 is capable of passing a nail penetration test without generating smoke or fire.

7. A cathode material comprising a mixture of lithium metal oxide and lithium metal phosphate in a solvent, wherein the lithium metal phosphate has a D50 equal to or less than 3.5 micrometers, has a volume fraction of secondary particles having a size of 0.1 to 3 micrometers that is from 5 to 100%, based on the total content of the lithium metal phosphate, wherein the mixture comprises 10% to 50% by weight of lithium metal phosphate, and wherein the lithium metal oxide is represented by the following formula:

$Li_xNi_y Mn_zCo_{(2-x-y-z)}D_wO_2$ or $Li_xNi_y Mn_zCo_{(2-x-y-z)}O_2$ wherein
x is a number from 0.9 to 1.15;
y is a number from 0.05 to 0.95;
z is a number from 0.05 to 0.95;
(2-x-y-z) is from 0.5 to 0.7; and
w is 0 to 0.4, and wherein D, when present, is selected from the group consisting of B, Al, Ti, Mg, Nb, Si, Fe, V, Cr Cu, Zn, Ga and W,
wherein, when coated on a metal foil, the cathode material forms a lithium metal oxide/lithium metal phosphate coating having a % theoretical density that is 40-55% of theoretical density.

8. The cathode material of claim 7, wherein the lithium metal phosphate comprises a volume fraction of secondary particles having a size of 0.1 to 3 micrometers that is at least 20%, based on the total content of the lithium metal phosphate.

9. The cathode material of claim 7, wherein the lithium metal phosphate comprises a volume fraction of secondary particles having a size of 0.1 to 3 micrometers that is at least 50%, based on the total content of the lithium metal phosphate.

10. The cathode material of claim 7, wherein the lithium metal phosphate has the formula:

$$Li_{1+a}Mn_bFe_cM_{1-b-c}PO_4,\qquad \text{Formula (I)}$$

wherein
- a is a number from 0.0 to 0.2;
- b is a number from 0.05 to 0.95;
- c is a number from 0.05 to 0.95; and
- (1−b−c) is from 0.0 to 0.2, wherein M is a metal ion selected from one or more of magnesium, calcium, strontium, cobalt, titanium, zirconium, molybdenum, vanadium, niobium, nickel, scandium, chromium, copper, zinc, beryllium, lanthanum and aluminum.

11. The cathode material of claim 7, wherein the lithium metal phosphate comprises a mixture of two different lithium metal phosphates, wherein
- a first lithium metal phosphate comprising a 20% volume fraction of secondary particles having a size of 0.1 to 3 micrometers, and
- a second lithium metal phosphate comprising a 0% volume fraction of secondary particles having a size of 0.1 to 3 micrometers is 0%, and wherein said mixture of lithium metal phosphates has at least a 20% volume fraction of secondary particles having a size of 0.1 to 3 micrometers.

12. A cathode comprised of a metal foil having a first and second face and cathode material coated on at least one face of the foil, the cathode material being comprised of a mixture of lithium metal oxide and lithium metal phosphate, wherein the lithium metal phosphate has a D50 equal to or less than 3.5 micrometers, wherein the amount of lithium metal phosphate is 10% to 50% by weight of the mixture, wherein the lithium metal phosphate comprises a volume fraction of secondary particles having a size of 0.1 to 3 micrometers is at least 20%, based on the total content of the lithium metal phosphate, and wherein the lithium metal oxide is represented by the following formula:

$$Li_xNi_yMn_zCo_{(2-x-y-z)}D_wO_2 \text{ or } Li_xNi_yMn_zCo_{(2-x-y-z)}O_2$$

wherein
- x is a number from 0.9 to 1.15;
- y is a number from 0.05 to 0.95;
- z is a number from 0.05 to 0.95;
- (2−x−y−z) is from 0.5 to 0.7; and
- w is 0 to 0.4, and wherein D, when present, is selected from the group consisting of B, Al, Ti, Mg, Nb, Si, Fe, V, Cr Cu, Zn, Ga and W,
- wherein the cathode material forms a lithium metal oxide/lithium metal phosphate coating on the metal foil, wherein the lithium metal oxide/lithium metal phosphate coating has a % theoretical density that is 40-55% of theoretical density.

13. A lithium ion battery comprising the cathode material of claim 7.

* * * * *